(No Model.)
S. H. MACY.
DEVICE FOR UNWINDING BARBED WIRE.
No. 461,118. Patented Oct. 13, 1891.
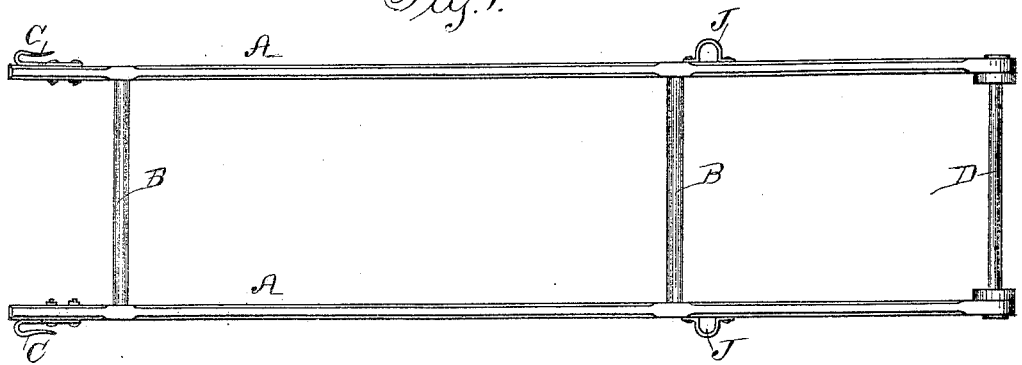
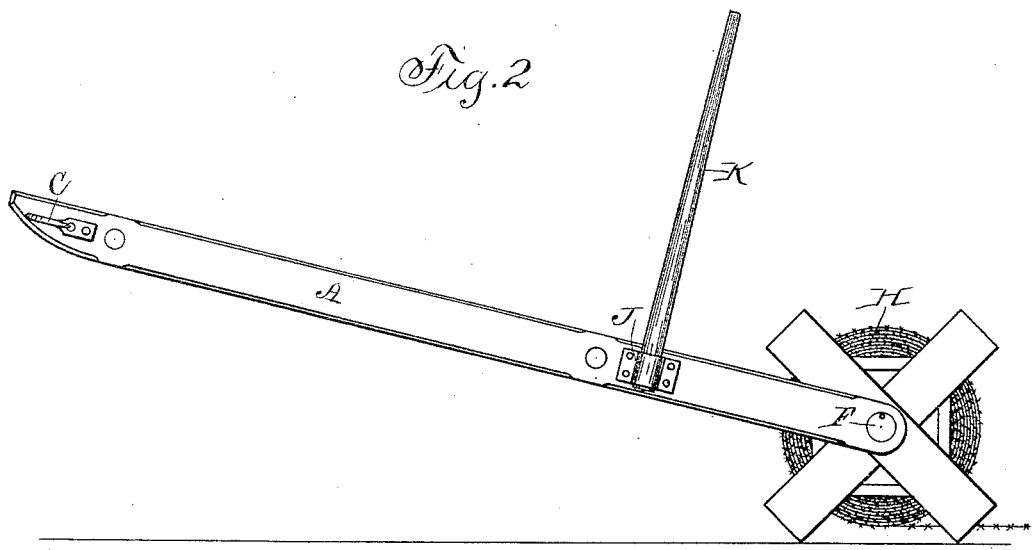

UNITED STATES PATENT OFFICE.

SAMUEL H. MACY, OF NEW PROVIDENCE, IOWA.

DEVICE FOR UNWINDING BARBED WIRE.

SPECIFICATION forming part of Letters Patent No. 461,118, dated October 13, 1891.

Application filed September 2, 1890. Serial No. 363,774. (No model.)

*To all whom it may concern:*

Be it known that I, SAMUEL H. MACY, a citizen of the United States of America, and a resident of New Providence, in the county of Hardin and State of Iowa, have invented a new and useful Device for Unwinding Barbed Wire, of which the following is a specification.

The object of the invention is to facilitate unwinding fence-wire from a spool alongside of a row of fence-posts, as required in making wire fences.

The invention consists in the construction and novel combination and arrangement of parts hereinafter fully described, illustrated in the accompanying drawings, and pointed out in the claim hereto appended.

Figure 1 is a top or plan view, and Fig. 2 a side view, of my complete device in position as required for practical use.

A A represent side bars, which are connected by means of cross-pieces B B and provided with hooks C C on their forward ends, by which hooks attachment is made to the animal to draw the said frame in a forward direction; or, if desired, the said frame may be drawn by a man.

D represents a rod or shaft loosely mounted in bearings formed in or attached to the rear end portions of the side bars A A.

F F represent metal flaps pivoted on the outer sides of the side bars A A, which in their normal position prevent longitudinal movement of the shaft D. Either of the flaps F F may be moved to one side of the shaft D to admit of the said shaft being removed to place a spool of wire thereon.

H represents a spool of common form, having wire wound thereon, which is mounted upon the shaft D by the insertion of the said shaft through the perforation in the center of the spool H.

J J represent metal clips fixed to the outer sides of the side bars A A, near the rear end portions thereof, in such a manner as to form sockets to admit and support a guiding-bar K therein. Said guiding-bar consists of a rod supported in a vertical position by means of the sockets, as aforesaid.

In the practical use of my device I mount a spool of wire thereon, as hereinbefore described, and fix the free end of the wire to a post. I then draw the device along, the spool rolling on the ground in the desired direction. If animal-power be used as a motor, the operator keeps the device in the desired position by means of the guiding-bar K. As the device proceeds, the arms of the spools are alternately brought into engagement with the ground, and an intermitting rotary motion of the spool results, thereby laying the wire on the ground in an approximately straight line and drawing said wire comparatively taut, which results it is desirable to obtain without being obliged to handle the wire.

I claim as my invention—

The combination of the frame consisting of the side bars A, provided with bearing-openings at their rear ends, and the cross-bars connecting the side bars, a shaft arranged in said bearing-openings, the eccentrically-pivoted disks arranged on the outer faces of the side bars, closing the bearing-openings and detachably securing the shaft, and the guide-levers K, clipped to the frame, substantially as described.

SAMUEL H. MACY.

Witnesses:
C. C. BULKLEY,
S. C. SWEET.